United States Patent
Li

(10) Patent No.: US 12,261,327 B2
(45) Date of Patent: Mar. 25, 2025

(54) BATTERY MODULE AND ELECTRIC DEVICE

(71) Applicant: Dongguan Poweramp Technology Limited, Dongguan (CN)

(72) Inventor: Bing Li, Dongguan (CN)

(73) Assignee: Dongguan Poweramp Technology Limited, Dongguan (CN)

( * ) Notice: Subject to any disclaimer, the term of this patent is extended or adjusted under 35 U.S.C. 154(b) by 531 days.

(21) Appl. No.: 17/732,825

(22) Filed: Apr. 29, 2022

(65) Prior Publication Data

US 2022/0367980 A1   Nov. 17, 2022

(30) Foreign Application Priority Data

Apr. 29, 2021  (CN) .................... 202110479767.7

(51) Int. Cl.
*H01M 50/505* (2021.01)
*H01M 50/209* (2021.01)
*H01M 50/264* (2021.01)
*H01M 50/516* (2021.01)

(52) U.S. Cl.
CPC ....... *H01M 50/505* (2021.01); *H01M 50/209* (2021.01); *H01M 50/264* (2021.01); *H01M 50/516* (2021.01)

(58) Field of Classification Search
None
See application file for complete search history.

(56) References Cited

U.S. PATENT DOCUMENTS

2020/0220128 A1*  7/2020  Kim ................. H01M 10/6551

FOREIGN PATENT DOCUMENTS

| CN | 211350711 U | 8/2020 |
| CN | 112582719 A | 3/2021 |
| CN | 212907887 U | 4/2021 |

OTHER PUBLICATIONS

First Office Action of CN application No. 202110479767.7, dated May 7, 2022.
Second Office Action of CN application No. 202110479767.7, dated Feb. 14, 2023.
Decision to grant patent right of CN application No. 202110479767.7, dated Sep. 1, 2023.

* cited by examiner

*Primary Examiner* — Wyatt P McConnell
(74) *Attorney, Agent, or Firm* — Ladas & Parry LP

(57) ABSTRACT

A battery module includes a plurality of battery units and at least one bus bar, where each of the battery units includes a first frame and a battery cell, the first frame is provided with an accommodating space for accommodating the battery cell, the battery cell includes an encapsulating case and an electrode terminal extending out of the encapsulating case. Each battery unit further includes at least one conductive sheet, the conductive sheet is disposed on the first frame, the electrode terminal of the battery cell is connected to the conductive sheet, and the bus bar is connected to conductive sheets of two adjacent battery units. With the conductive sheet provided on the first frame, the bus bar is connected to conductive sheets of two adjacent battery units to implement series-parallel connection and assembly between battery cells on different first frames, so that the entire battery module can be connected.

20 Claims, 15 Drawing Sheets

BATTERY MODULE AND ELECTRIC DEVICE

CROSS REFERENCE TO RELATED APPLICATION

The present application claims priority to Chinese Patent Application No. 202110479767.7, filed on Apr. 29, 2021, the disclosure of which is hereby incorporated by reference in its entirety.

TECHNICAL FIELD

This application relates to the field of module assembly technologies for battery cells, and in particular, to a battery module and an electric device.

BACKGROUND

At present, for battery modules, battery cells are typically pre-compressed by using a battery cell frame, a fixing end plate, and a steel strap and by applying a huge external force to compress foam; and a bus bar holder is welded to tabs of the battery cells to implement a series-parallel relationship. The battery cells need to be assembled into a module by using large welding equipment, dedicated pressurization equipment, and a variety of process protection fixtures, featuring a relatively complex process. For different series-parallel relationships, molds of customized copper bus bar holders of different sizes need to be built. Moreover, additional fixing end plates and fixing steel straps are required to make the module as a whole, with many types of materials and high material costs. In this way, module assembly materials have a variety of types and high costs, and the pressurization-based module assembly process is complex and requires dedicated large-scale welding and pressurization equipment in production, resulting in high equipment investment costs. Therefore, existing module assembly of battery cells has the problems of a complex process and inconvenience in disassembling and replacing a single battery cell of a module.

SUMMARY

In view of this, this application provides a battery module and an electric device, so as to improve the problems of existing module assembly of battery cells; a complex process and inconvenience in disassembling and replacing a single battery cell of a module.

An aspect of this application provides a battery module, including a plurality of battery units and at least one bus bar, where each of the battery units includes a first frame and a battery cell, the first frame is provided with an accommodating space for accommodating the battery cell, and the battery cell includes an encapsulating case and an electrode terminal extending out of the encapsulating case. Each battery unit further includes at least one conductive sheet, the conductive sheet is disposed on the first frame, the electrode terminal of the battery cell is connected to the conductive sheet, and the bus bar is connected to conductive sheets of two adjacent battery units.

With the conductive sheet provided on the first frame, the bus bar is connected to conductive sheets of two adjacent battery units to implement series-parallel connection and assembly between battery cells on different first frames, so that the entire battery module can be connected. A faulty battery cell or battery unit in the battery module can be replaced by removing the bus bar connected to the battery unit.

In some embodiments, the first frame includes a bottom portion, a first side portion, a second side portion, and a first protruding portion; the first side portion and the second side portion are provided on opposite sides of the bottom portion; the first protruding portion is disposed at one end of the bottom portion; the bottom portion, the first side portion, the second side portion, and the first protruding portion form the accommodating space; and the conductive sheet is disposed on the first protruding portion.

In some embodiments, the first frame is provided with a first hole, the battery module further includes a fastener, and the fastener is configured to fasten the first frame and a housing by passing through the first hole. When a plurality of first frames are stacked to form a battery module, fixing positions and the number of fasteners can be properly arranged through first holes, so as to fasten the first frames and the housing (for example, a chassis), thereby reducing an auxiliary fixing structure.

In some embodiments, the encapsulating case includes a receiving portion and a first-end edge sealing portion extending from periphery of the receiving portion; the receiving portion is configured to receive an electrode assembly of the battery cell; the electrode terminal is connected to the electrode assembly and extends out of the receiving portion from the first-end edge sealing portion; and the electrode terminal is at least partially disposed on the first protruding portion.

In some embodiments, the first frame includes a protrusion, and the protrusion and the bottom portion form a step. Along a stacking direction of the battery units, the receiving portion overlaps the bottom portion, the protrusion at least partially overlaps the first-end edge sealing portion, and the electrode terminal at least partially overlaps the first protruding portion. The protrusion and the bottom portion form a step, so that the accommodating space of the first frame can structurally match the battery cell accommodated therein.

In some embodiments, the accommodating space includes a first accommodating space and a second accommodating space that are provided on opposite sides of the bottom portion; and in two adjacent first frames, a first accommodating space of one first frame communicates with a second accommodating space of the other first frame, and one part of the receiving portion of the battery cell is provided in the first accommodating space and the other part is provided in the second accommodating space. When battery units are assembled into a battery module, a first accommodating space of one first frame may be used to support a battery cell accommodated in the first frame, and a second accommodating space may be used to cover a battery cell accommodated in another adjacent first frame.

In some embodiments, the battery unit further includes a buffer member disposed in the first accommodating space. The buffer member is in a compressed state. The buffer member can absorb external pressure of the battery cell to protect the battery cell accommodated in the first accommodating space, so that the battery cell accommodated in the first accommodating space can withstand a specific pre-compression required during assembly of the module, which helps improve a service life of the battery cell. Optionally, a material of the buffer includes foam. In some embodiments, the encapsulating case includes the receiving portion and the first-side edge sealing portion extending from the periphery of the receiving portion, and the first-side edge sealing portion is provided in the first accommodating space.

In some embodiments, the first protruding portion is provided with an isolation portion, and the isolation portion and the second accommodating space are provided on a same side of the bottom portion. The isolation portion that is provided can prevent direct connection between adjacent conductive sheets that are provided on two first frames.

In some embodiments, the first protruding portion is provided with an opening portion, and the conductive sheet is provided in the opening portion. The opening portion matching the conductive sheet is provided in the first protruding portion, so that the conductive sheet is placed in the opening portion to fill in the opening portion exactly.

In some embodiments, one end of the conductive sheet is welded to the electrode terminal, and the other end is welded to the bus bar. The bus bars are orderly connected to implement series and parallel connection between the battery cells, so that the entire battery module can be connected.

In some embodiments, the first protruding portion is provided with a first protrusion and a first groove matching the first protrusion, an opening of the first groove faces downward and is disposed just under the first protrusion. A first protrusion of one first frame can be fitted to a first groove of another adjacent first frame, so as to guide assembly between two adjacent first frames. Disposition of the first protrusion and the first groove facilitates rapid stacking of the first frame, thereby facilitating rapid assembly of battery units into a battery module.

An aspect of this application provides an electric device, including the battery module described above.

In the battery module of this application, the conductive sheet is provided on the first frame of the battery unit, so that the electrode terminal of the battery cell disposed inside the first frame and the bus bar can be electrically connected through slight welding or thermal melting, and the bus bar can be electrically connected to conductive sheets of two adjacent battery units, to implement series-parallel connection and assembly between battery cells arranged in different first frames, so that the entire battery module can be connected. A faulty battery cell or battery unit in the battery module can be replaced by removing the bus bar connected to the battery unit. It can be learned from the foregoing that the battery module in this application has a simple assembly process and features good maintainability. In a case that a single string of battery cells in an abnormal state is located through a monitoring technology, the single string of battery cells or a single battery cell can be replaced by replacing the battery unit.

BRIEF DESCRIPTION OF DRAWINGS

To describe the technical solutions in the embodiments of this application more clearly, the following briefly describes the accompanying drawings required for describing the embodiments of this application.

Reference signs: 1. first frame; 11a. first side portion; 11b. second side portion; 12a. first protruding portion; 12b. second protruding portion; 13. bottom portion; 14. buffer member; 16. first accommodating space; 17. second accommodating space; 18. protrusion; 111. buckle; 112. slot; 1211. first portion; 1212. second portion; 1213. thermal melting point; 1221. first limiting portion; 1222. second limiting portion; 1223. first side surface; 123. connecting member; 124. first hole; 126. first protrusion; 127. first groove; 128. isolation portion. 2. conductive sheet; 21. fixing hole; 4. battery cell; 41. electrode terminal; 42. encapsulating case; 421a. first-end edge sealing portion; 421b. second-end edge sealing portion; 422. receiving portion; 423a. first-side edge sealing portion; 423b. second-side edge sealing portion; 5. fastener; 10. first frame with a conductive sheet; 20. end frame; 30. bus bar; 31. through-hole; 40. battery unit; 50. fixing beam; 100. battery module; 201a. third side portion; 201b. fourth side portion; 202a. first end portion; 202b. second end portion; 203. groove bottom; X. first direction; Y. second direction; Z. third direction.

DETAILED DESCRIPTION

The following clearly describes the technical solutions in the embodiments of this application with reference to the accompanying drawings. Apparently, the described embodiments are only a part rather than all of the embodiments of this application. The embodiments in this application and features in the embodiments may be combined with each other without conflicts.

Figure 1:
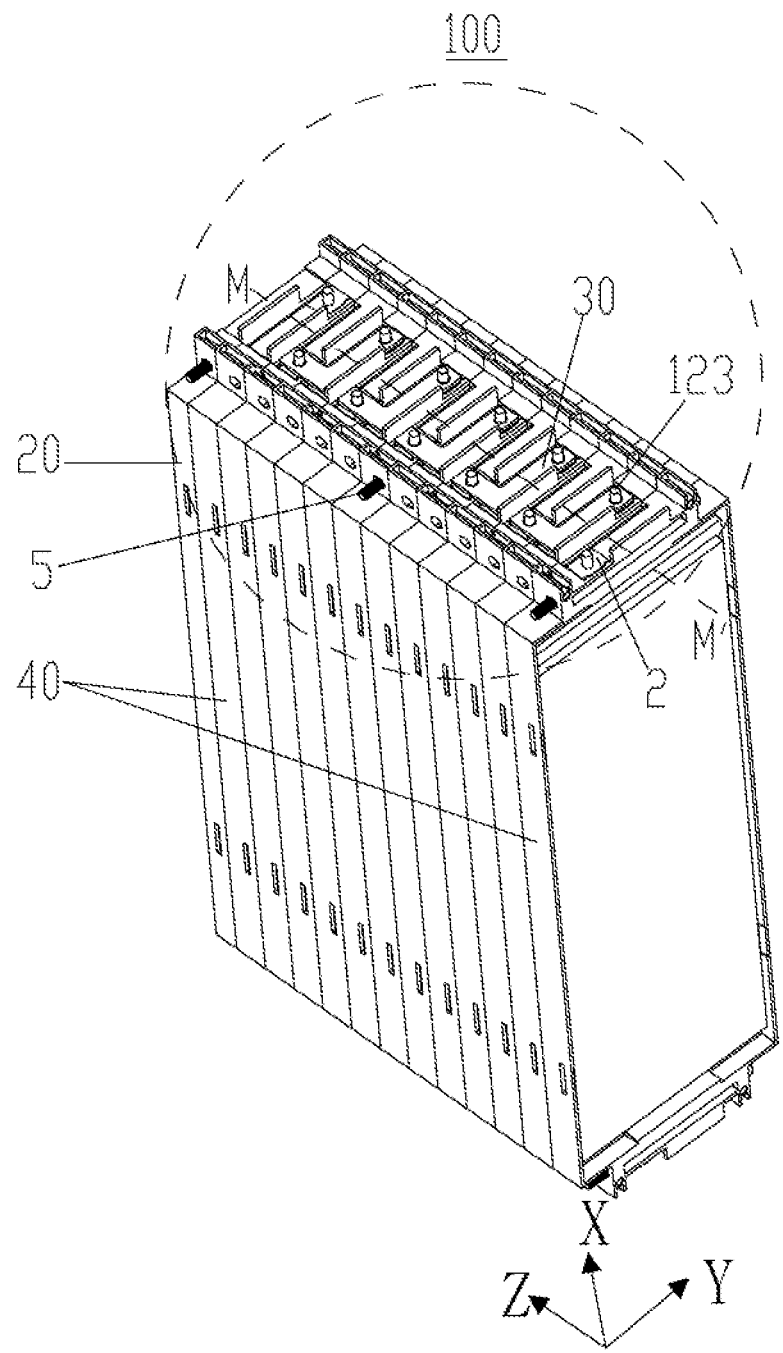
FIG. 1 is a schematic structural diagram of a battery module according to an embodiment of this application.
Figure 2:
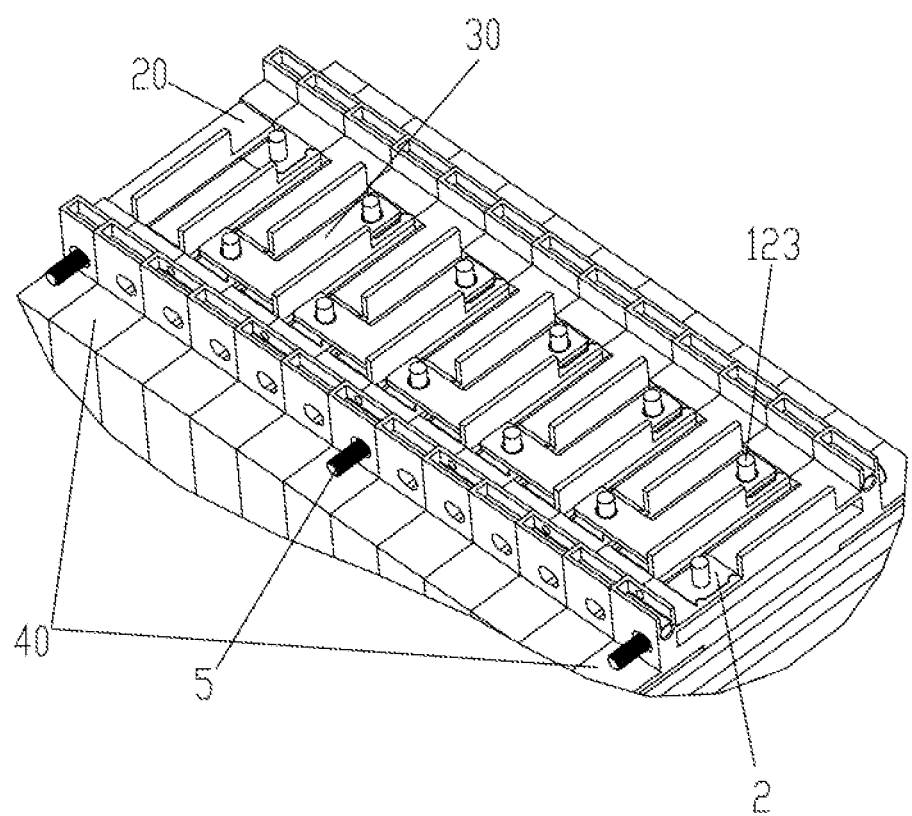
FIG. 2 is a partially enlarged view of a dashed area of the battery module shown in FIG. 1.
Figure 3:
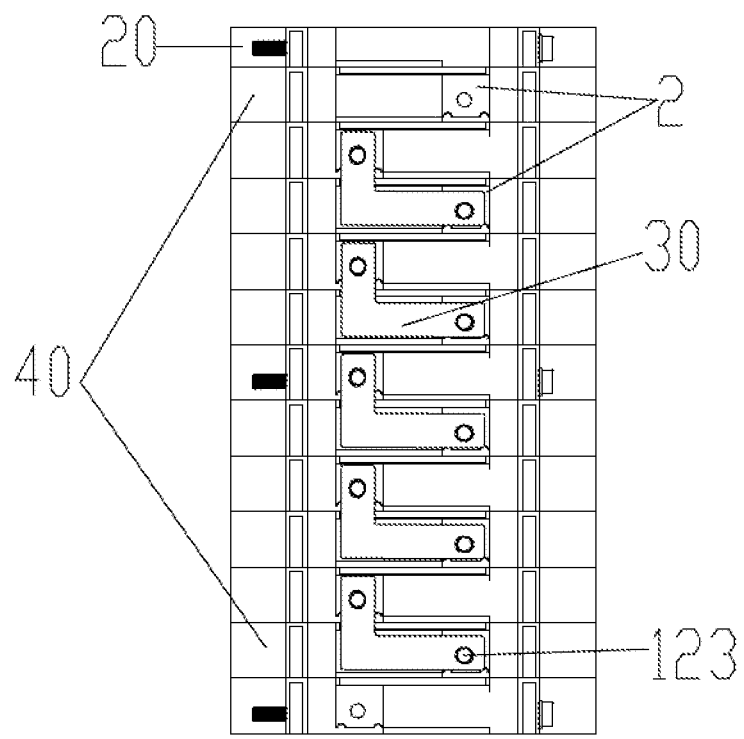
FIG. 3 is a top view of the battery module shown in FIG. 1.

Referring to FIG. 1 to FIG. 3. FIG. 6, and FIG. 10 to FIG. 17, an embodiment of this application provides a battery module 100, which includes a plurality of battery units 40 and at least one bus bar 30. There are a plurality of bus bars 30 in this embodiment. The plurality of battery units 40 are stacked along a third direction Z, and each battery unit 40 includes a first frame 1 and a battery cell 4. The first frame 1 is provided with an accommodating space for accommodating the battery cell 4, and the bus bar 30 is connected to conductive sheets 2 of two adjacent battery units 40.

In some embodiments, one end of the conductive sheet 2 is connected to an electrode terminal 41, and the other end of the conductive sheet 2 is connected to the bus bar 30. Optionally, the conductive sheet 2 is welded to the electrode terminal 41, for example, through laser welding. Optionally, the conductive sheet 2 is welded to the bus bar 30, for example, through laser welding.

In some embodiments, the bus bar 30 is disposed between adjacent first frames 1 to implement series or parallel connection between battery cells 4 in the adjacent first frames 1. It should be understood that the bus bar 30 may be, but is not limited to, an L-shaped conductive sheet, an elongated conductive sheet, and the like. The bus bars 30 are orderly connected to implement series and parallel connection between the battery cells 4, so that the entire battery module 100 can be connected. In some other embodiments, the bus bar 30 is composed of at least an L-shaped metal sheet. For example, the bus bar may be an L-shaped copper bus bar, which is only an example and not limited. Optionally, the bus bar 30 is provided with at least two throughholes 31, and the bus bar 30 is connected between adjacent first frames 1 through the at least two through-holes 31. The first frame 1 is provided with a connecting member 123, and connecting members 123 of adjacent first frames 1 are respectively disposed in two through-holes 31, which facilitates positioning and fastening of the connecting members 123 and the first frames 1. Optionally, the connecting member 123 includes an insulating portion, and the connecting member 123 is melted through a thermal melting process, to help further fasten the connecting member 123.

Figure 13:
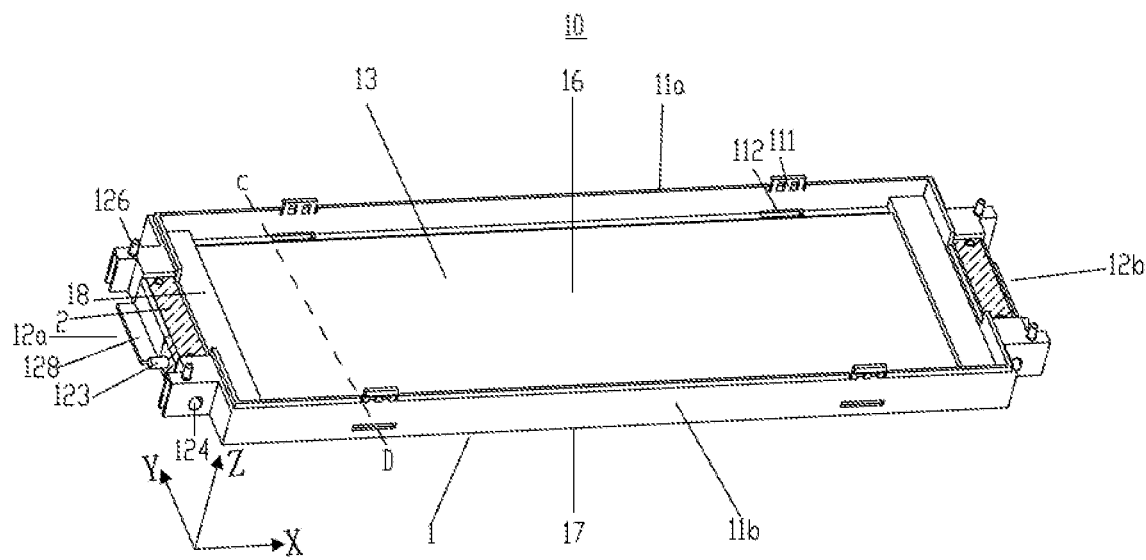
FIG. 13 is a schematic structural diagram of a first frame with a conductive sheet in the battery unit shown in FIG. 11.
Figure 14:
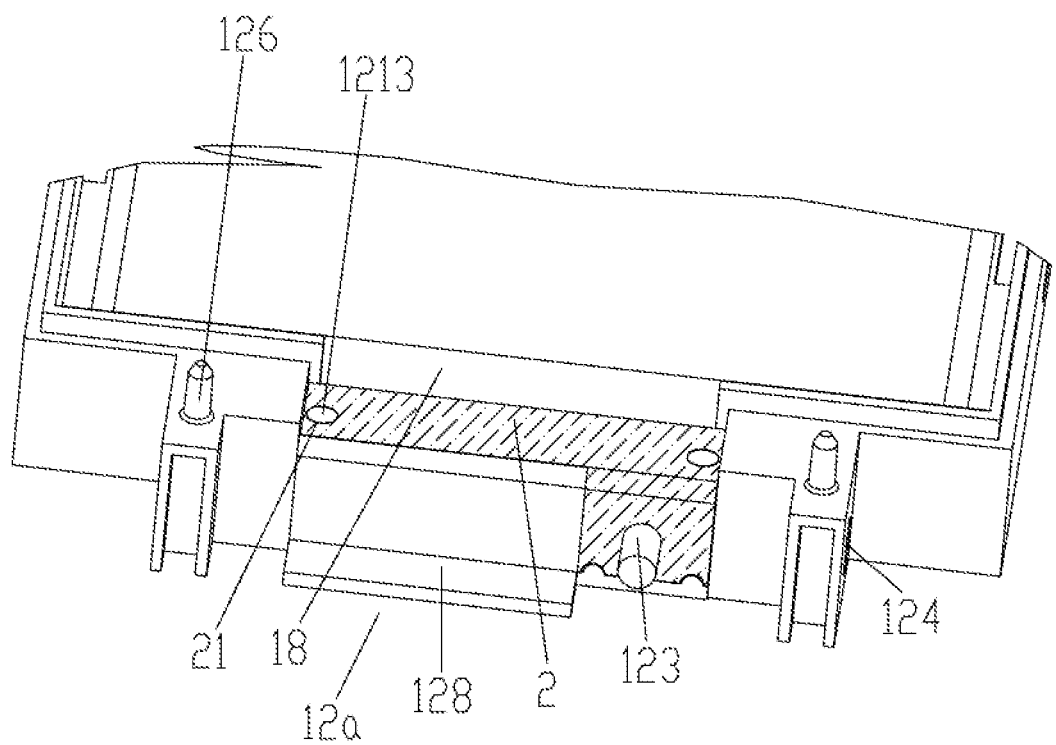
FIG. 14 is an enlarged view of a left half pant of the first frame with a conductive sheet that is shown in FIG. 13 and cut along a dashed line CD.
Figure 16:
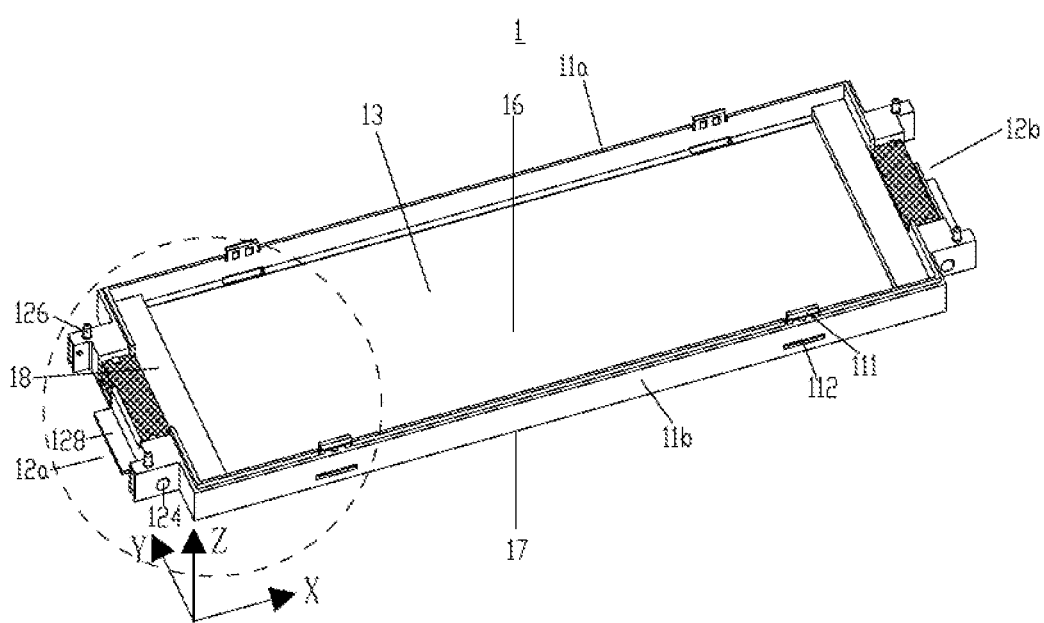
FIG. 16 is a schematic structural diagram of a first frame in the battery unit shown in FIG. 11.
Figure 17:
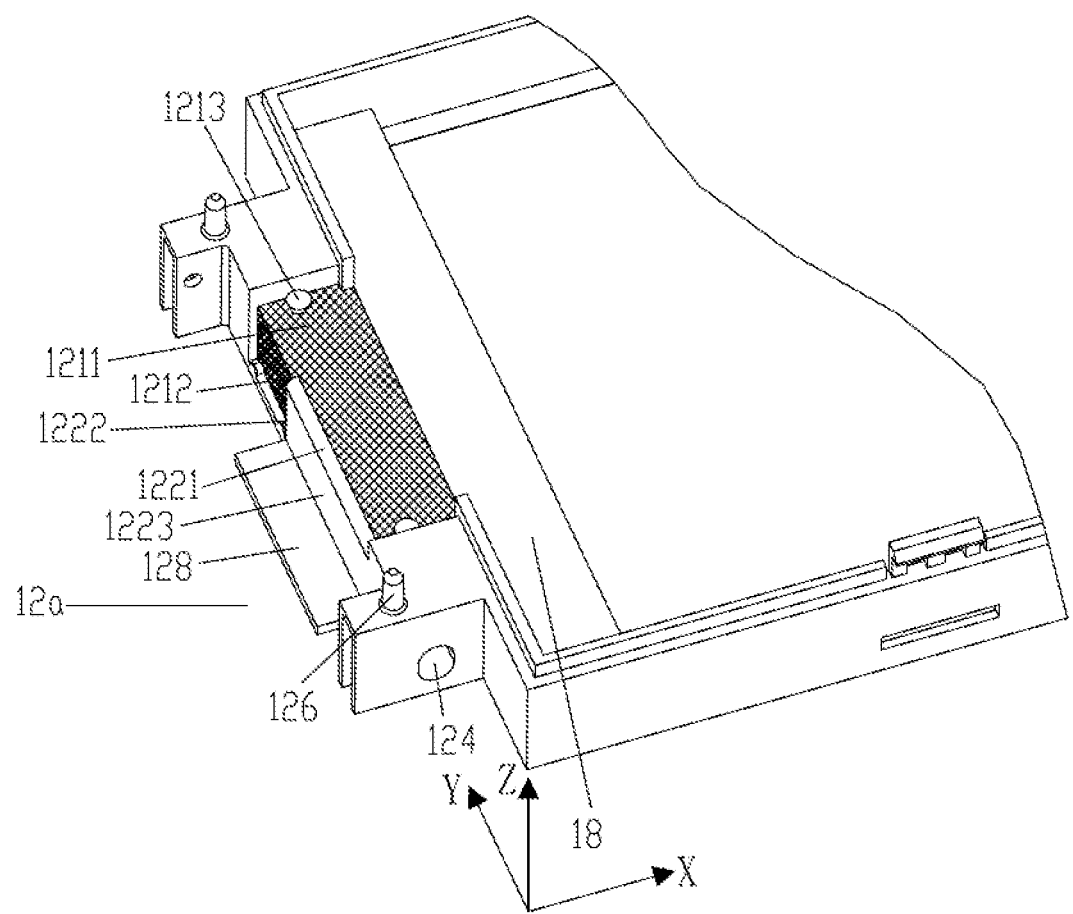
FIG. 17 is a partially enlarged view of a dashed area of the first frame shown in FIG. 16.

Referring to FIG. 13, FIG. 14. FIG. 16, and FIG. 17, in some embodiments, the first frame 1 includes a bottom portion 13, a first side portion 11a, a second side portion 11b, and a first protruding portion 12a. Along a second direction Y, the first side portion 11a and the second side portion 11b are provided on opposite sides of the bottom portion 13. The first protruding portion 12a is disposed at one end of the bottom portion 13 along the second direction Y. The bottom portion 13, the first side portion 11a, the second side portion 11b, and the first protruding portion 12a form an accommodating space, and the accommodating space includes a first accommodating space 16 and a second accommodating space 17 that are provided along a third direction Z. The first accommodating space 16 and the second accommodating space 17 are provided on opposite sides of the bottom portion 13. The first accommodating space 16 and the second accommodating space 17 are configured to accommodate the battery cell 4.

In some other embodiments, the first frame 1 may further include a second protruding portion 12b, the second protruding portion 12b and the first protruding portion 12a are disposed opposite each other along the first direction X. and the second protruding portion 12b and the first protruding portion 12a are disposed on opposite sides of the bottom portion 13. The first side portion 11a, the second side portion 11b, the first protruding portion 12a, and the second protruding portion 12b are arranged around the bottom portion 13, and the first protruding portion 12a, the second protruding portion 12b, the first side portion 11a, the second side portion 11b, and the bottom portion 13 form an accommodating space. The accommodating space includes a first accommodating space 16 and a second accommodating space 17 arranged along the third direction Z. The first accommodating space 16 and the second accommodating space 17 are provided on opposite sides of the bottom portion 13. The first accommodating space 16 and the second accommodating space 17 are configured to accommodate the battery cell 4.

In an embodiment, the first protruding portion 12a is provided with an opening portion, and the opening portion includes a first portion 1211 and a second portion 1212. The first protruding portion 12a includes the first portion 1211 and a first limiting portion 1221 that are disposed along the third direction Z, the conductive sheet 2 is at least partially disposed on the first portion 1211, and the first limiting portion 1221 limits movement of the conductive sheet 2 along an opposite direction of the first direction X. Referring to FIG. 14. FIG. 16, and FIG. 17, the first protruding portion 12a includes the second portion 1212 and a second limiting portion 1222 that are disposed along the second direction Y, the conductive sheet 2 is at least partially disposed on the second portion 1212, and the second limiting portion 1222 limits movement of the conductive sheet 2 along an opposite direction of the second direction Y. Optionally, the first portion 1211 communicates with the second portion 1212.

Figure 15:
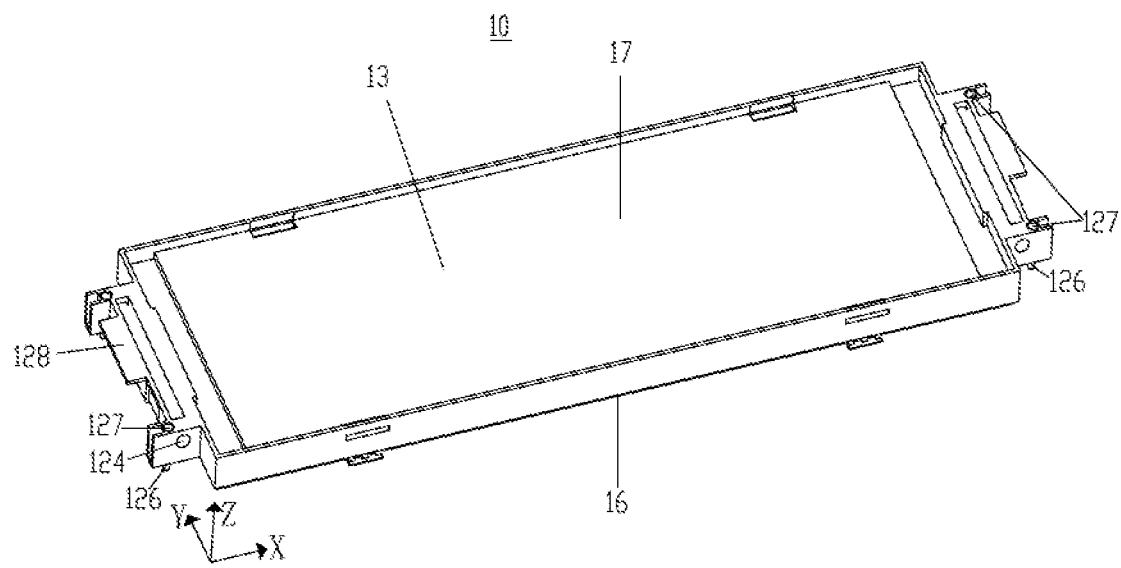
FIG. 15 is a view of the first frame with a conductive sheet that is shown in FIG. 13 and placed upside down.

Referring to FIG. 15 to FIG. 17, in an embodiment, the first frame 1 further includes an isolation portion 128, the first protruding portion 12a includes a first side surface 1223, and the isolation portion 128 extends from the first side surface 1223 along the first direction X. The isolation portion 128 is disposed between adjacent bus bars 30 to increase an insulation distance between the adjacent bus bars 30 and reduce a risk of short circuits of the battery module 100.

Figure 19:
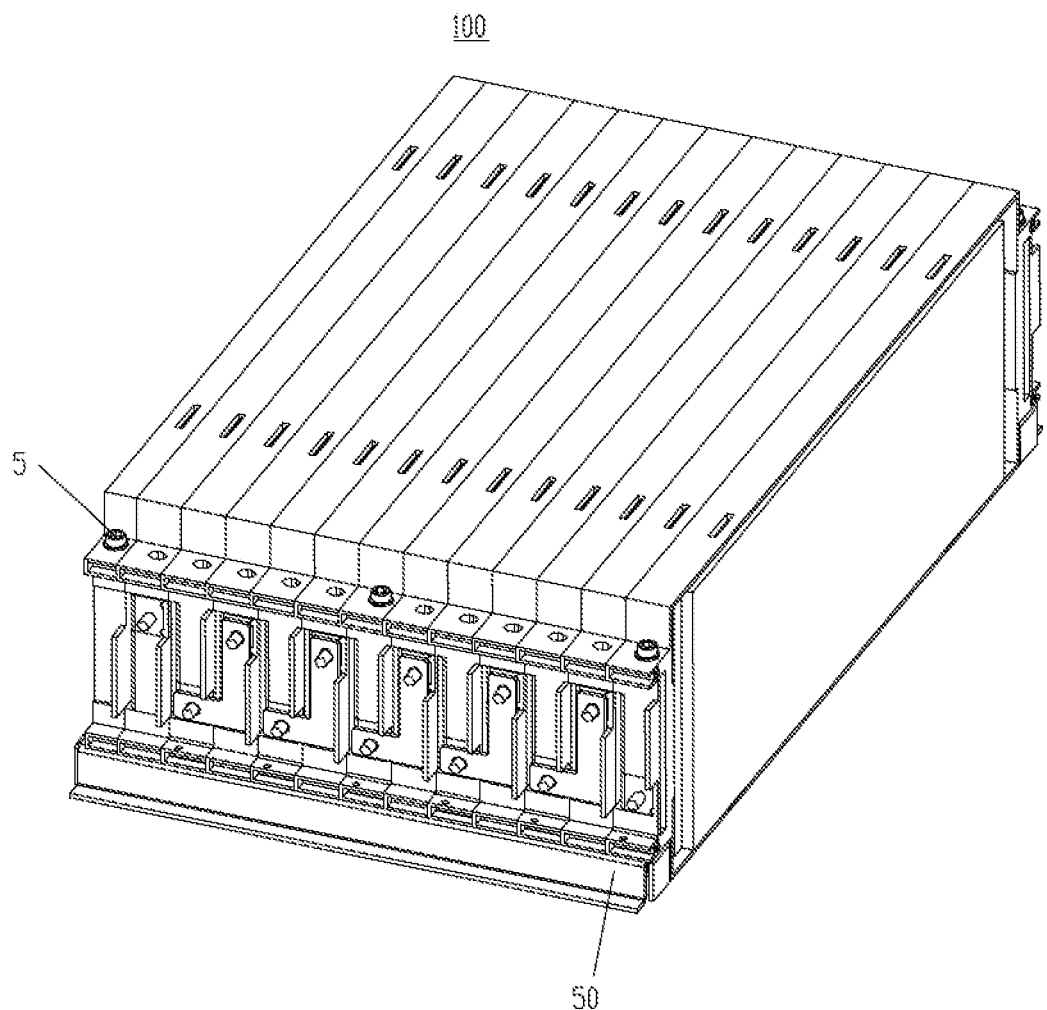
FIG. 19 is a schematic structural diagram of another battery module according to an embodiment of this application.

In some embodiments, the first frame 1 is provided with a first hole 124 running through the first protruding portion 12a, the battery module 100 further includes a fastener 5, and the fastener 5 passes through the first hole 124 to fasten the first frame 1 and a housing. As an example rather than a limitation, the housing may be a chassis, and the chassis is configured to accommodate first frames or battery units that are stacked. Optionally, the first hole 124 runs through the first protruding portion 12a along the second direction Y. and the first hole 124 and the second accommodating space 17 are provided on a same side of the first frame 1. When a plurality of first frames 1 are stacked to form a battery module, fixing positions and the number of the fasteners 5 can be properly arranged by using the first holes 124, and a threaded end of the fastener 5 is connected to a threaded hole of the housing, so as to fasten the first frames and the housing, thereby reducing an auxiliary fixing structure. The chassis is used to accommodate a plurality of battery units or first frames that are stacked. As an example rather than a limitation, the fastener 5 may be, but is not limited to, a tightening threaded rod. In some embodiments, the battery module 100 further includes a housing (not shown in the figure, such as a chassis), and the fastener 5 may be fastened to the housing, for example, a matching threaded hole is provided in the housing. Optionally, referring to FIG. 19, the fastener 5 may be fastened to a fixing beam 50 of the chassis, not requiring additional fixing end plates and fixing steel straps, thereby reducing types of materials used for module assembly and types of auxiliary fixing materials and decreasing module costs. In some implementation, the housing includes a battery compartment (not shown in the figure), the fastener 5 may be fastened to the battery compartment, and a matching threaded hole is provided in the battery compartment.

In some embodiments, the second protruding portion 12b is provided with a first hole 124, and the first hole 124 and the second accommodating space 17 are provided on a same side of the bottom portion 13. The first hole 124 runs through the second protruding portion 12b along the second direction Y. When a plurality of first frames are stacked to form a battery module, fixing positions and the number of the fasteners can be properly arranged by using the first holes 124, so as to fasten the first frames and the chassis, thereby reducing an auxiliary fixing structure. Optionally, structures of the first protruding portion 12a and the second protruding portion 12b are basically the same.

Referring to FIG. 13, in an embodiment, the first frame 1 includes two conductive sheets 2, one conductive sheet 2 is disposed on the first protruding portion 12a, and the other conductive sheet 2 is disposed on the second protruding portion 12b.

Referring to FIG. 13, FIG. 14, and FIG. 16 to FIG. 18, in some embodiments, the battery cell 4 includes an encapsulating case 42 and an electrode terminal 41 (41 may be a tab) extending out of the encapsulating case 42. The encapsulating case 42 includes a receiving portion 422 and a first-end edge sealing portion 421a extending from periphery of the receiving portion 422. The receiving portion 422 is configured to accommodate an electrode assembly (not shown in the figure) of the battery cell 4. The electrode terminal 41 is connected to the electrode assembly (not shown in the figure) and extends out of the receiving portion 422 from the first-end edge sealing portion 421a, and the electrode terminal 41 is at least partially disposed on the first protruding portion 12a.

Figure 7:
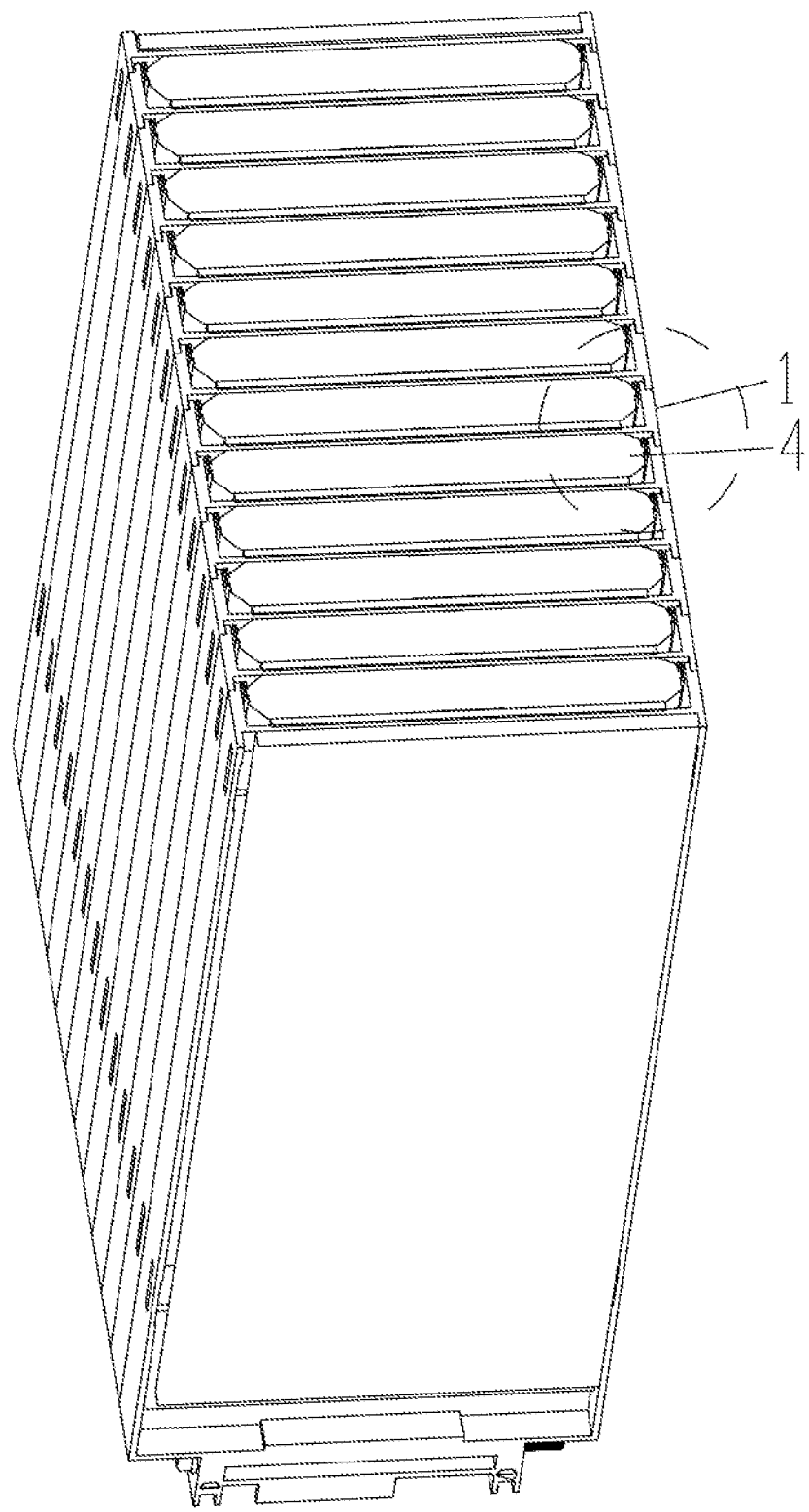
FIG. 7 is a schematic structural diagram of a lower half part of the battery module that is shown in FIG. 6 and cut horizontally along a dashed line NN'.
Figure 8:
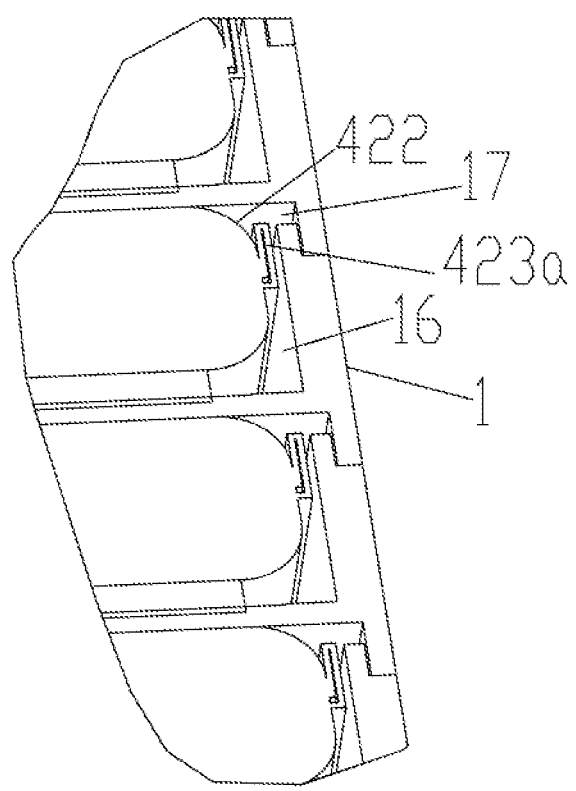
FIG. 8 is a partially enlarged view of a dashed area of a cross section of the battery module shown in FIG. 7.

Referring to FIG. 11 to FIG. 16, in some embodiments, the first frame 1 further includes a protrusion 18, the protrusion 18 and the bottom portion 13 form a step, and the protrusion 18 is provided on a side of the bottom portion 13 close to the first accommodating space 16. Along the stacking direction Z of the battery units 40, the receiving portion 422 overlaps the bottom portion 13, the protrusion 18 at least partially overlaps the first-end edge sealing portion 421a, and the electrode terminal 41 at least partially overlaps the first protruding portion 12a. The battery cell 4 is disposed between adjacent first frames 1, part of the battery cell 4 is disposed in the first accommodating space 16, and part of the battery cell 4 is disposed in the second accommodating space 17. A second accommodating space 17 of a first frame 1 of one battery unit 40 covers a battery cell 4 of an adjacent battery unit 40, to implement stacking of the battery units 40. Further, referring to FIG. 7 and FIG. 8, for adjacently arranged first frames 1, a first accommodating space 16 of one of the first frames 1 communicates with a second accommodating space 17 of the other first frame 1. One part of the receiving portion 422 of the battery cell 4 is provided in the first accommodating space 16, and the other part is provided in the second accommodating space 17.

Figure 11:
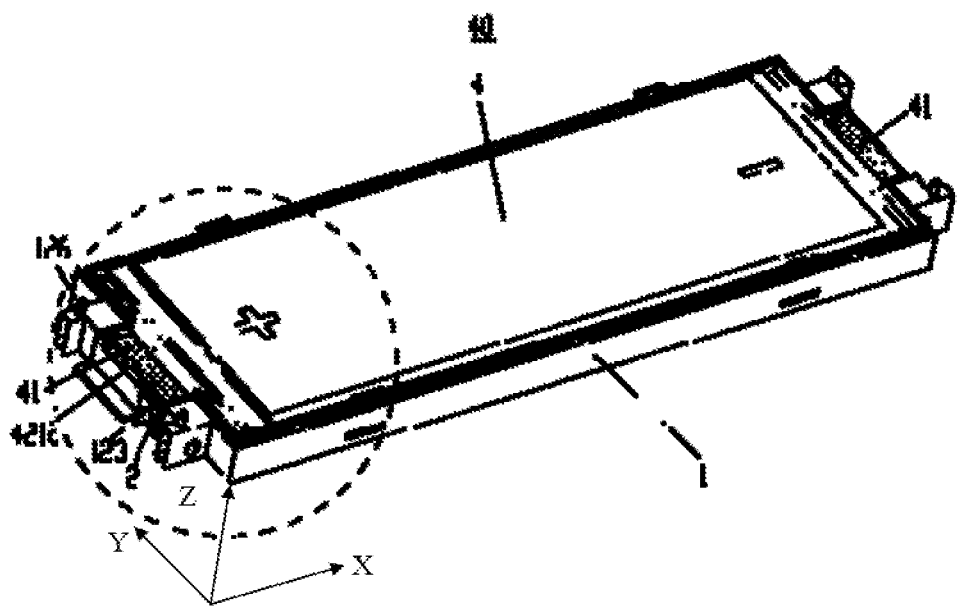
FIG. 11 is a schematic structural diagram of a battery unit in the battery module shown in FIG. 1.
Figure 12:
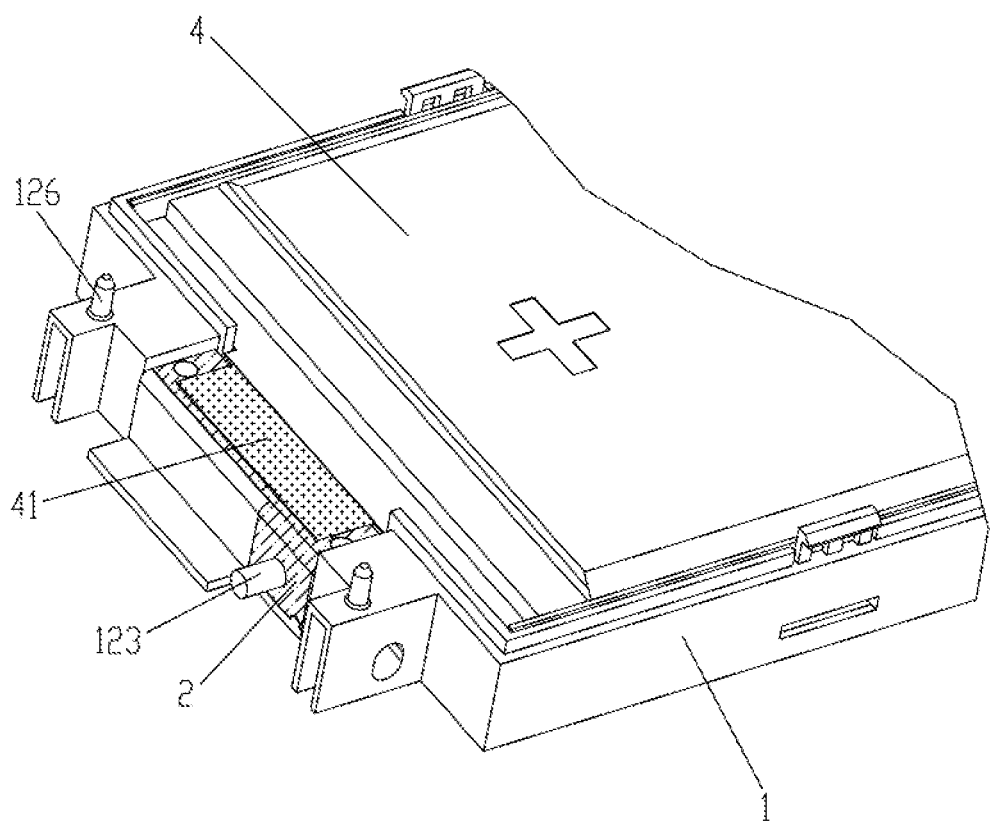
FIG. 12 is a partially enlarged view of a dashed area of the battery unit shown in FIG. 11.
Figure 18:
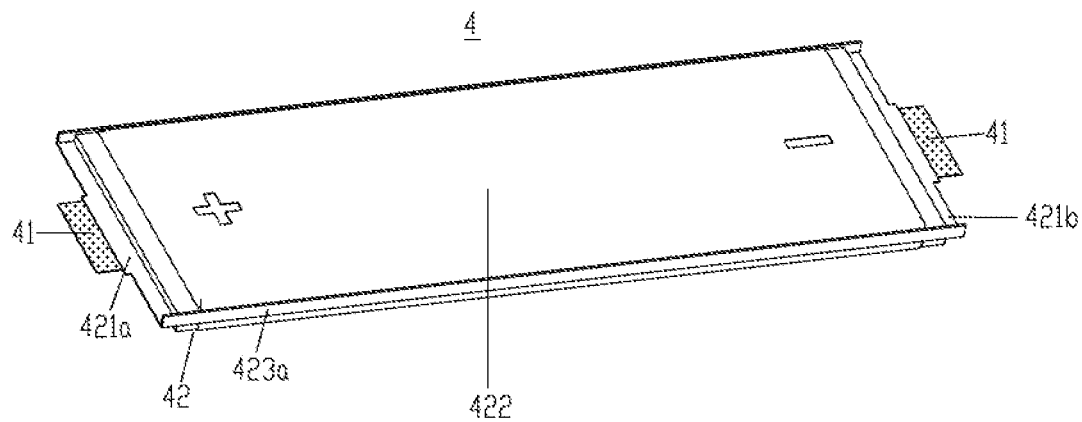
FIG. 18 is a schematic structural diagram of a battery cell in the battery unit shown in FIG. 11.

Referring to FIG. 11 and FIG. 18, optionally, in some embodiments, the encapsulating case 42 includes a receiving portion 422 and a first-side edge sealing portion 423a extending from periphery of the receiving portion 422. Also referring to FIG. 7 and FIG. 8, the first-side edge sealing portion 423a is provided in the first accommodating space 16.

In some embodiments, the battery cell 4 includes a first-end edge sealing portion 421a and a second-end edge sealing portion 421b that are disposed at opposite ends of the receiving portion 422, and the electrode terminal 41 includes a positive electrode terminal and a negative electrode terminal, where one electrode terminal extends out of the receiving portion 422 from the first-end edge sealing portion 421a, and the other electrode terminal extends out of the receiving portion 422 from the second-end edge sealing portion 421b. The positive electrode terminal and the negative electrode terminal are welded to the conductive sheet 2, and the conductive sheet 2 is disposed on the first protruding portion 12a or the second protruding portion 12b of the first frame 1, so as to implement electrical connection between the battery cell 4 and the conductive sheet 2.

Figure 4:
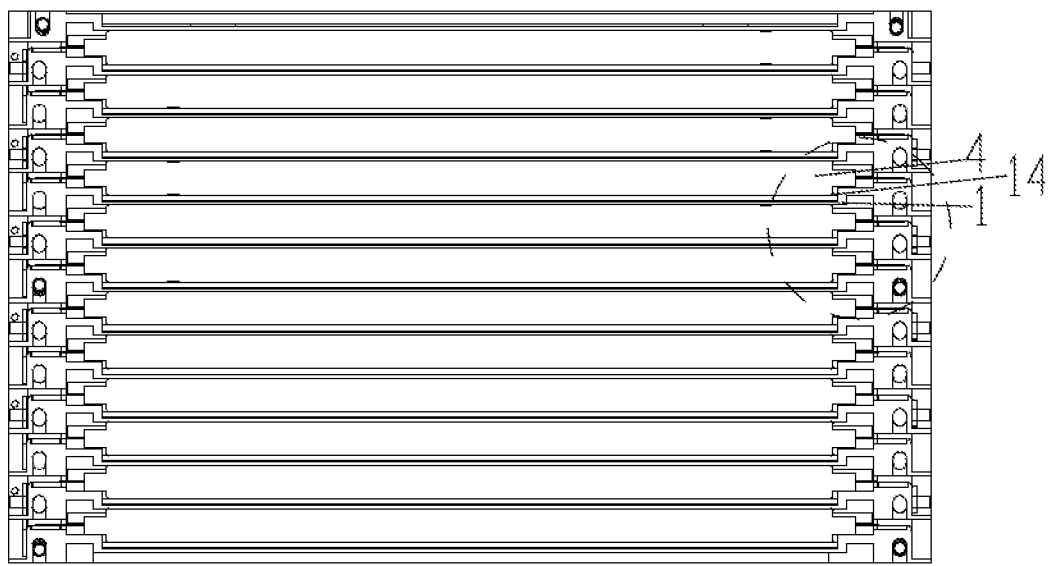
FIG. 4 is a schematic diagram of a cross section that is obtained by longitudinally cutting the battery module shown in FIG. 1 along a dashed line M- and that is horizontally placed.
Figure 5:
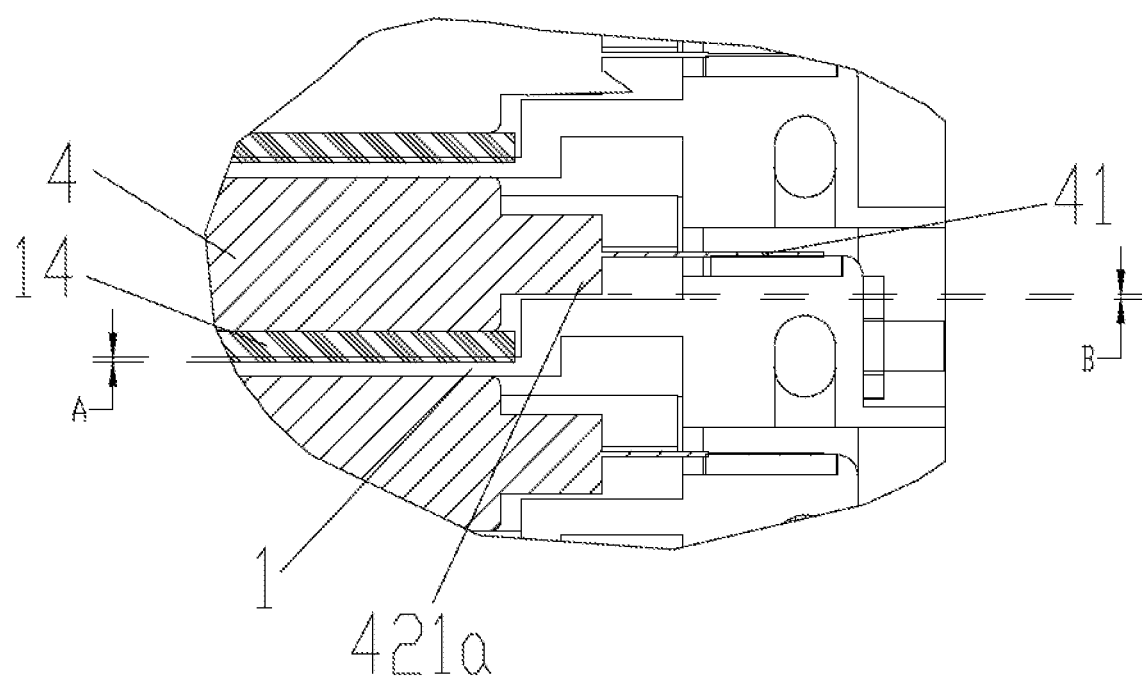
FIG. 5 is a partially enlarged view of a dashed area of the cross section shown in FIG. 4.
Figure 6:
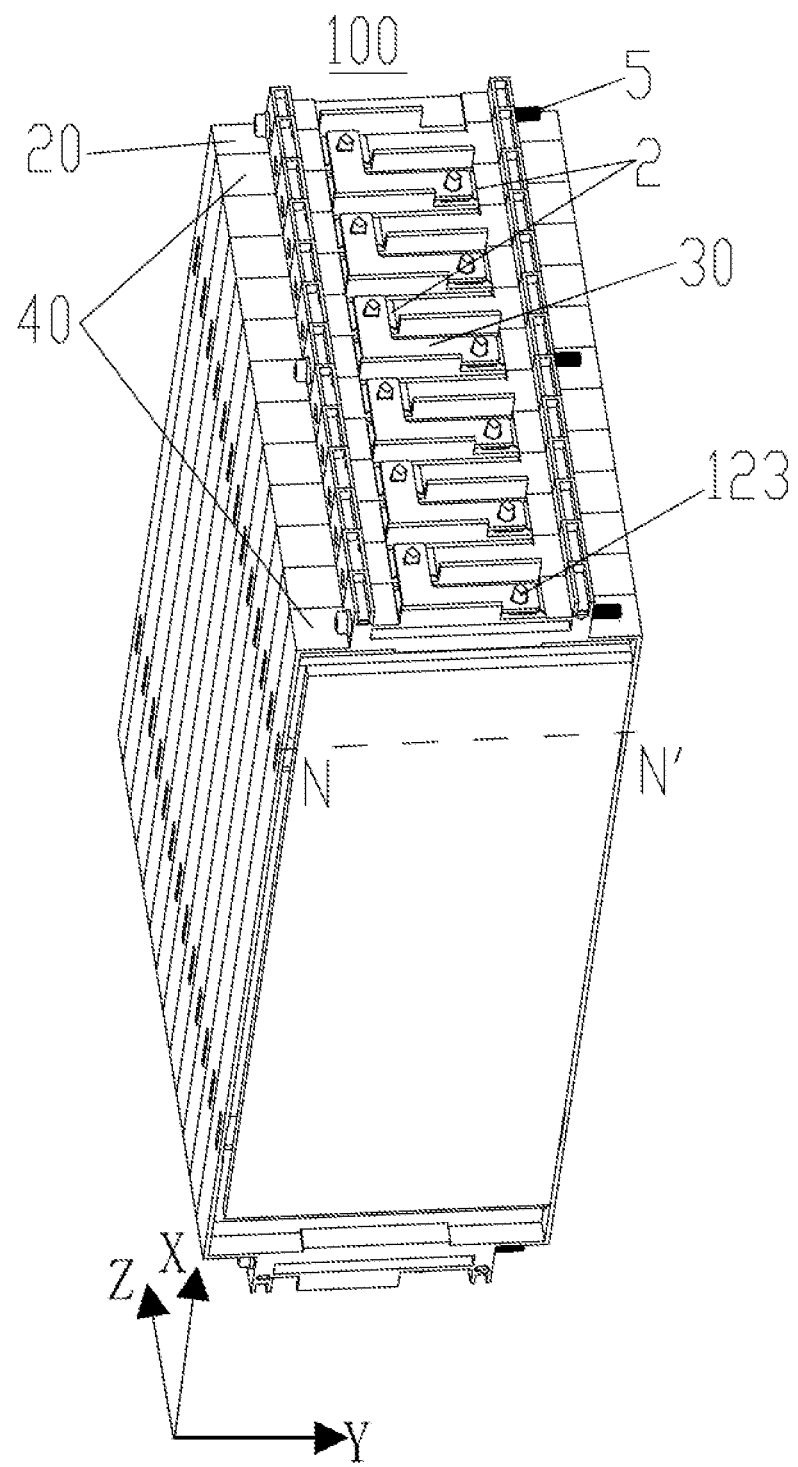
FIG. 6 is a schematic structural diagram of another battery module according to an embodiment of this application.

Referring to FIG. 4 and FIG. 5, in some embodiments, the battery unit 40 further includes a buffer member 14 disposed in the first accommodating space 16, and the buffer member 14 is in a compressed state. Further, the buffer member 14 is attached to the bottom portion 13, and the buffer member 14 is configured to absorb pressure to protect the battery cell 4 accommodated in the first accommodating space 16. It should be understood that after the battery module 100 is assembled, the buffer member 14 is in the compressed state, and a gap B between the first-end edge sealing portion 421a of the battery cell 4 and the first frame 1 is greater than 0; before the battery module 100 is assembled, the buffer member 14 is not compressed, and the gap B between the first-end edge sealing portion 421a and the first frame 1 is greater than a compressed amount A of the buffer member 14 present when the battery module 100 is assembled. When the first frames 1 accommodating the battery cells 4 are stacked together, the first frames can be stacked more tightly by applying relatively small pressure. For example, a specific external force is required for fitting a buckle to a slot, and a specific pressure is also applied on the battery cell 4. A specific amount of initial compression can be obtained by attaching a buffer member to the bottom portion, and a single battery cell can withstand a specific pressure, which helps improve a service life of the battery cell. The sum of a thickness of the buffer member 14 in a natural state and a thickness of the battery cell 4 is a centimeters, and the sum of a height of the second accommodating space 16 and a height of the first accommodating space 17 is b centimeters. Then, a maximum deformation of the buffer member along the third direction Z is not less than a-b centimeters. In this way, the battery cell 4 accommodated in the fast frame 1 is protected from being damaged during pre-compression. Further, a material of the buffer member 14 may include foam.

Referring to FIG. 13, FIG. 14, FIG. 16, and FIG. 17, the conductive sheet 2 is provided with one or more fixing holes 21, and the opening portion formed by the first portion 1211 and the second portion 1212 matches the conductive sheet 2 in size and shape. The first portion 1211 is provided with a thermal melting point 1213 matching the fixing hole 21, and the conductive sheet 2 is sleeved on the thermal melting point 1213 through the fixing hole 21 and is fastened to the first protruding portion 12a through thermal melting. As an example rather than a limitation, in some embodiments, the conductive sheet 2 may be an L-shaped conductive sheet. In an embodiment, an opening portion (not shown) and a thermal melting point 1213 (not shown) that match the conductive sheet 2 in size and shape are provided on the second protruding portion 12b, and the conductive sheet 2 is sleeved on the thermal melting point 1213 through the fixing hole 21 and is fastened to the second protruding portion 12b through thermal melting.

Referring to FIG. 13 to FIG. 15, in some embodiments, the first protruding portion 12a and/or the second protruding portion 12b may further include a connecting member 123, a through-hole (not shown) is provided in the conductive sheet 2, and the connecting member 123 is disposed on the first protruding portion 12a or the second protruding portion 12b by running through the through-hole of the conductive sheet 2. The connecting member 123 is configured to fasten the conductive sheet 2 and the bus bar 30, and the bus bar 30 can be separately installed on connecting members 123 of different first frames through at least two through-holes provided in the bus bar 30, so as to implement, through thermal melting or welding, series or parallel connection between battery cells accommodated in the different first frames. It should be understood that the connecting member 123 and the first protruding portion 12a and/or the second protruding portion 12b of the first frame 1 may be integrally formed, or may be installed on the first protruding portion 12a and/or the second protruding portion 12b of the first frame.

Figure 9:
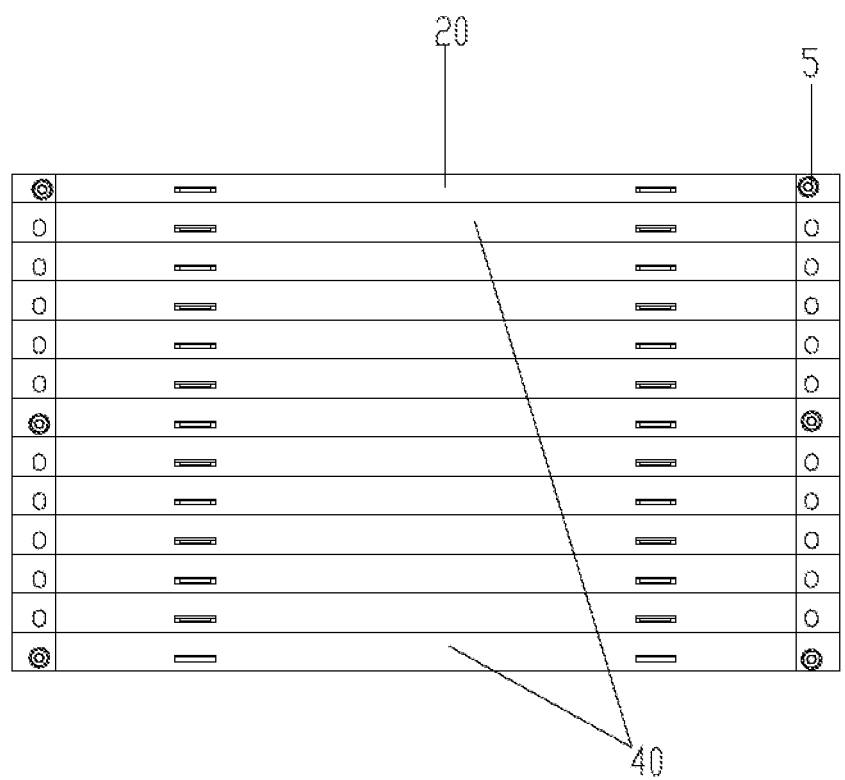
FIG. 9 is a left view of the battery module (horizontally placed) shown in FIG. 6.
Figure 10:
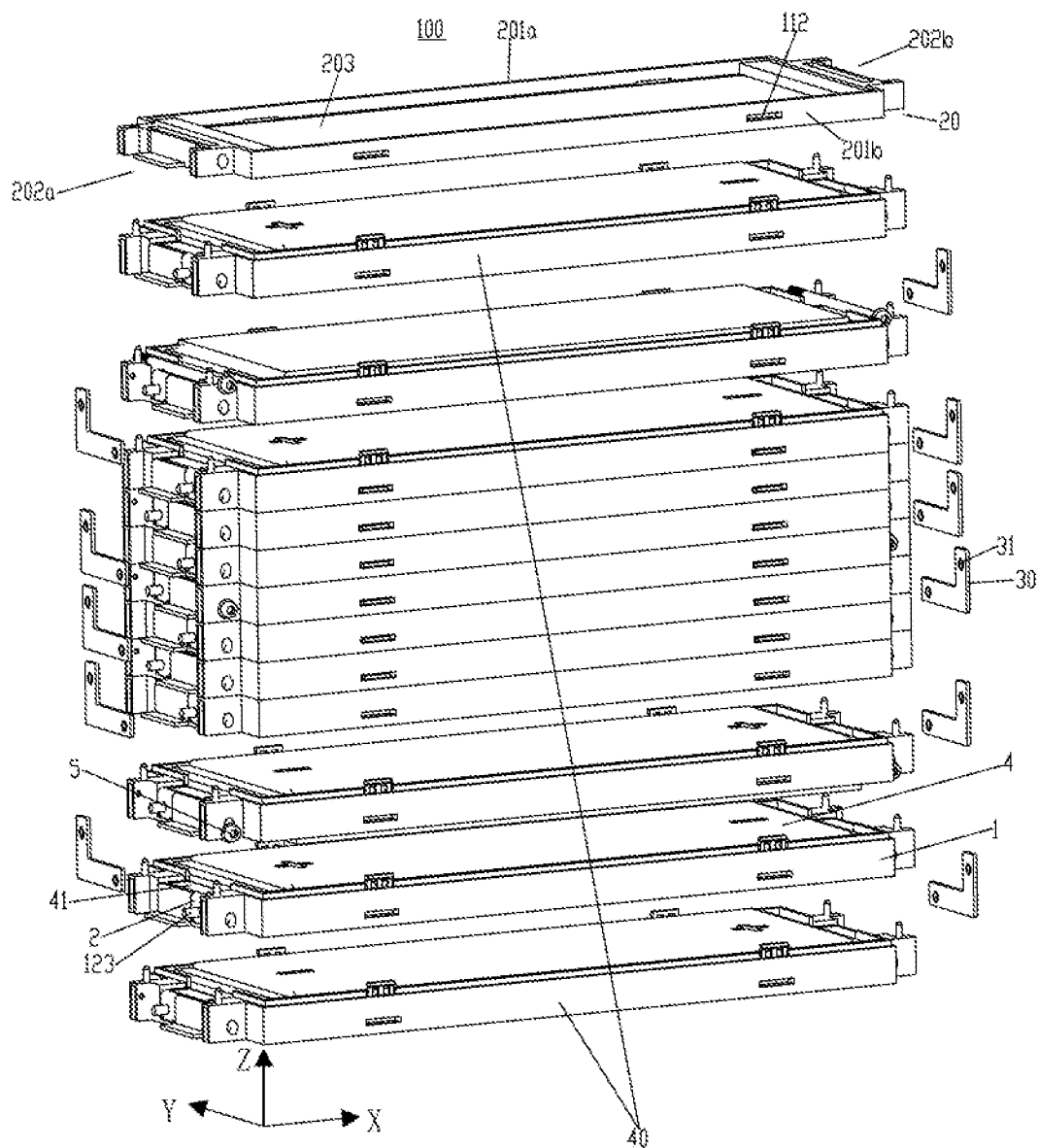
FIG. 10 is a schematic structural diagram of a battery module during disassembly according to an embodiment of this application.

Referring to FIG. 13 and FIG. 16, in some embodiments, the first side portion 11a has a buckle 111 and a slot 112 matching the buckle 111. Part of the first side portion 11a extends outward along the third direction Z to form the buckle 111, and part of an opening of the first side portion 11a forms the slot 112. Referring to FIG. 9 and FIG. 10, a buckle 111 of one first frame can be fastened to a slot 112 of another adjacent first frame through the buckle. This facilitates tight stacking of the first frames, and further facilitates tight stacking of battery units in which the first frames are located.

Referring to FIG. 13 and FIG. 16, in some embodiments, the second side portion 11b has a buckle 111 and a slot 112 matching the buckle 11. Part of the second side portion 11b extends outward along the third direction Z to form the buckle 111, and part of an opening of the second side portion 11b forms the slot 112. Referring to FIG. 9 and FIG. 10, a buckle 111 of one first frame can be fastened to a slot 112 of another adjacent first frame through the buckle. This facilitates tight stacking of the first frames, and further facilitates tight stacking of battery units in which the first frames are located.

In some embodiments, the first protruding portion 12a is provided with a first protrusion 126 and a first groove 127 matching the first protrusion 126, an opening of the first groove 127 faces downward and is disposed just under the first protrusion 126. Also referring to FIG. 10, a first protrusion 126 of one first frame 1 can be fitted to a first groove 127 of another adjacent first frame 1, so as to guide assembly between two adjacent first frames 1. It should be understood that the first protrusion 126 may be a cylinder or a polygonal prism, such as a quadrangular prism or a triangular prism. The opening of the first groove 127 faces downward and is formed just under the first protrusion 126 along the third direction Z.

Referring to FIG. 15, in some embodiments, the second protruding portion 12b is provided with a first protrusion 126 and a first groove 127 matching the first protrusion 126. An opening of the first groove 127 faces downward and is disposed just under the first protrusion 126. Also referring to FIG. 10, a first protrusion 126 of one first frame 1 can be fitted to a first groove 127 of another adjacent first frame 1, so as to guide assembly between two adjacent first frames 1.

Referring to FIG. 10, the battery module 100 may further include an end frame 20. The end frame 20 is provided with an accommodating groove (not shown in the figure) with an opening facing downward, and the accommodating groove is configured to cover battery cells 4 of the battery units 40 under the end frame 20. Optionally, a structure of the accommodating groove is basically the same as that of the second accommodating space.

In some embodiments, the end frame 20 may include a groove bottom 203, a third side portion 201a, a fourth side portion 201b, and a first end portion 202a. The third side portion 201a and the fourth side portion 201b are disposed on opposite sides of the groove bottom 203. The first end portion 202a is disposed at one end of the groove bottom 203. The groove bottom 203, the third side portion 201a, the fourth side portion 201b, and the first end portion 202a form an accommodating groove. In some other embodiments, the end frame 20 may further include a second end portion 202b, and the second end portion 202b is disposed at the other end of the groove bottom 203 and is disposed opposite the first end portion 202a.

In some embodiments, the third side portion 201a and/or the fourth side portion 201b is provided with a slot 112 that matches the buckle 111 of the first frame 1, and the slot 112 is configured to fit to a buckle 111 of an adjacent first frame 1 below the slot 112 through the buckle, so as to implement tight stacking of the end frame 20 and the first frame 1. This helps fit the buckle 111 to the slot 112 by applying a relatively small pressure, and helps tightly cover the battery cells 4 in the battery units 40 by the end frame 20. In some embodiments, the first end portion 202a and/or the second end portion 202b of the end frame 20 has a first groove (not shown in the figure) matching the first protrusion 126 of the first frame 1, and the first groove is configured to sleeve a first protrusion 126 of an adjacent first frame 1 below the first groove, so as to guide assembly of the end frame 20 and the first frame 1.

This application further provides an electric device, including the battery module of the foregoing embodiment.

Although this application has been shown and described with respect to one or more implementations, equivalent variations and modifications can be figured out by those skilled in the art based on reading and understanding of this specification and the accompanying drawings. This application includes all such modifications and variations and is merely limited by the scope of the appended claims. In particular, with respect to various functions performed by the components described above, the terms used to describe such components are intended to correspond to any component that performs a specified function (for example, which is functionally equivalent) of the component (unless otherwise indicated), even if the component is not structurally equivalent to the disclosed structure that performs the functions in the example implementations of the specification shown in this specification.

That is, the foregoing descriptions are merely embodiments of this application, and the protection scope of this application is not limited thereto. All equivalent structure or process changes made according to the content of this specification and accompanying drawings in this application, such as combination of technical features between the embodiments, or by directly or indirectly applying this application in other related technical fields shall fall within the protection scope of this application.

In the descriptions of this application, it should be understood that the orientations or positional relationships indicated by the terms "longitudinal", "transverse", "thickness". "upper". "lower". "left". "bottom", "inside". "outside", and the like are based on the orientations or positional relationships shown in the accompanying drawings, and are merely intended to facilitate the descriptions of this application and simplify the descriptions, instead of being intended to indicate or imply that the apparatuses or components mentioned in this application must have specific orientations, or be constructed and operated for a specific orientation; and therefore shall not be construed as a limitation to this application. In addition, for structural elements with the same or similar features, this application may use the same or different reference signs for identification. Also, the terms "first" and "second" are used only for ease of description and cannot be construed as indicating or implying relative importance or implicitly indicating the number of technical features. Therefore, characteristics defined as "first" and "second" may explicitly or implicitly include one or more characteristics. In the description of this application, unless otherwise specified. "plurality" means at least two.

This application provides the foregoing description to enable any person skilled in the art to implement and use this application. In the foregoing description, various details are provided for the purpose of explanation. This application is not intended to be limited to the embodiments that are shown, but to comply with a widest scope of the principles and characteristics disclosed in this application.

What is claimed is:

1. A battery module, comprising:
a plurality of battery units and at least one bus bar,
wherein each of the battery units comprises a first frame and a battery cell, the first frame is provided with an accommodating space for accommodating the battery cell, and the battery cell comprises an encapsulating case and an electrode terminal extending out of the encapsulating case; and
wherein each battery unit further comprises at least one conductive sheet, the conductive sheet is disposed on the first frame, the electrode terminal of the battery cell is connected to the conductive sheet, and the bus bar is connected to conductive sheets of two adjacent battery units.

2. The battery module according to claim 1, wherein the first frame comprises a bottom portion, a first side portion, a second side portion and a first protruding portion; the first side portion and the second side portion are provided on opposite sides of the bottom portion; the first protruding portion is disposed at one end of the bottom portion; the bottom portion, the first side portion, the second side portion and the first protruding portion form the accommodating space; and the conductive sheet is disposed on the first protruding portion.

3. The battery module according to claim 1, wherein the first frame is provided with a first hole, the battery module further comprises a fastener, and the fastener is configured to fasten the first frame and a housing by passing through the first hole.

4. The battery module according to claim 2, wherein the encapsulating case comprises a receiving portion and a first-end edge sealing portion extending from periphery of the receiving portion; the receiving portion is configured to receive an electrode assembly of the battery cell; the electrode terminal is connected to the electrode assembly and extends out of the receiving portion from the first-end edge sealing portion; and the electrode terminal is at least partially disposed on the first protruding portion.

5. The battery module according to claim 4, wherein the first frame comprises a protrusion, and the protrusion and the bottom portion form a step; and along a stacking direction of the battery units, the receiving portion overlaps the bottom portion, the protrusion at least partially overlaps the first-end edge sealing portion, and the electrode terminal at least partially overlaps the first protruding portion.

6. The battery module according to claim 4, wherein the accommodating space comprises a first accommodating space and a second accommodating space that are provided on opposite sides of the bottom portion; and in two adjacent first frames, a first accommodating space of one first frame communicates with a second accommodating space of the other first frame, and one part of the receiving portion of the battery cell is provided in the first accommodating space and the other part is provided in the second accommodating space.

7. The battery module according to claim 6, wherein the battery unit further comprises a buffer member disposed in the first accommodating space.

8. The battery module according to claim 6, wherein the encapsulating case comprises the receiving portion and the first-side edge sealing portion extending from the periphery of the receiving portion, and the first-side edge sealing portion is provided in the first accommodating space.

9. The battery module according to claim 6, wherein the first protruding portion is provided with an isolation portion, and the isolation portion and the second accommodating space are provided on a same side of the bottom portion.

10. The battery module according to claim 2, wherein the first protruding portion is provided with an opening portion, and the conductive sheet is provided in the opening portion.

11. The battery module according to claim 1, wherein one end of the conductive sheet is welded to the electrode terminal, and the other end is welded to the bus bar.

12. An electric device, comprising a battery module, wherein the battery module comprises a plurality of battery units and at least one bus bar;
wherein each of the battery units comprises a first frame and a battery cell, the first frame is provided with an accommodating space for accommodating the battery cell, and the battery cell comprises an encapsulating case and an electrode terminal extending out of the encapsulating case; and
wherein each battery unit further comprises at least one conductive sheet, the conductive sheet is disposed on the first frame, the electrode terminal of the battery cell is connected to the conductive sheet, and the bus bar is connected to conductive sheets of two adjacent battery units.

13. The electric device according to claim 12, wherein the first frame comprises a bottom portion, a first side portion, a second side portion, and a first protruding portion; the first side portion and the second side portion are provided on opposite sides of the bottom portion; the first protruding portion is disposed at one end of the bottom portion; the bottom portion, the first side portion, the second side portion, and the first protruding portion form the accommodating space; and the conductive sheet is disposed on the first protruding portion.

14. The electric device according to claim 12, wherein the first frame is provided with a first hole, the battery module further comprises a fastener, and the fastener is configured to fasten the first frame and a housing by passing through the first hole.

15. The electric device according to claim 13, wherein the encapsulating case comprises a receiving portion and a first-end edge sealing portion extending from periphery of the receiving portion; the receiving portion is configured to receive an electrode assembly of the battery cell; the electrode terminal is connected to the electrode assembly and extends out of the receiving portion from the first-end edge sealing portion; and the electrode terminal is at least partially disposed on the first protruding portion.

16. The electric device according to claim 15, wherein the first frame comprises a protrusion, and the protrusion and the bottom portion form a step; and along a stacking direction of the battery units, the receiving portion overlaps the bottom portion, the protrusion at least partially overlaps the first-end edge sealing portion, and the electrode terminal at least partially overlaps the first protruding portion.

17. The electric device according to claim 15, wherein the accommodating space comprises a first accommodating space and a second accommodating space that are provided on opposite sides of the bottom portion; and in two adjacent first frames, a first accommodating space of one first frame communicates with a second accommodating space of the other first frame, and one part of the receiving portion of the battery cell is provided in the first accommodating space and the other part is provided in the second accommodating space.

18. The electric device according to claim 17, wherein the encapsulating case comprises the receiving portion and the first-side edge sealing portion extending from the periphery of the receiving portion, and the first-side edge sealing portion is provided in the first accommodating space.

19. The electric device according to claim 17, wherein the first protruding portion is provided with an isolation portion, and the isolation portion and the second accommodating space are provided on a same side of the bottom portion.

20. The electric device according to claim 13, wherein the first protruding portion is provided with an opening portion, and the conductive sheet is provided in the opening portion.

* * * * *